United States Patent [19]

D'Antonio et al.

[11] Patent Number: 4,823,619
[45] Date of Patent: Apr. 25, 1989

[54] SENSOR AND TRANSDUCER APPARATUS

[76] Inventors: Nicholas F. D'Antonio; Nicholas J. D'Antonio, both of 7695 Admiral Dr., Liverpool, N.Y. 13088

[21] Appl. No.: 834,939

[22] Filed: Feb. 28, 1986

[51] Int. Cl.[4] .............................................. G01L 1/02
[52] U.S. Cl. .................................................. 73/862.58
[58] Field of Search ................ 73/862.64, 862.58, 172, 73/862.37; 177/208, 209; 116/269; 374/188, 201, 202, 203, 204; 340/573; 128/721, 722

[56] References Cited

U.S. PATENT DOCUMENTS

| 1,316,281 | 9/1919 | Dalton | 73/862.58 X |
|---|---|---|---|
| 2,284,364 | 5/1942 | Breazeale | 73/862.48 X |
| 2,382,695 | 8/1945 | DeGiers | 73/299 |
| 2,758,472 | 8/1956 | Bowen, Jr. | 73/862.45 |
| 3,142,981 | 8/1964 | Gross | 73/862.64 X |
| 3,206,971 | 9/1965 | Felix | 73/862.64 |
| 3,261,203 | 7/1966 | Young | 73/862.58 |
| 3,306,384 | 2/1967 | Ross | 177/209 X |
| 3,522,858 | 8/1970 | Christensen | 177/208 |
| 3,727,606 | 4/1973 | Sielaff | 340/573 X |
| 3,791,375 | 2/1974 | Pfeiffer | 73/172 |
| 4,175,263 | 11/1979 | Triplett et al. | 340/573 |
| 4,208,918 | 6/1980 | Miyamae | 73/728 X |
| 4,324,259 | 4/1982 | Wright | 128/722 |

Primary Examiner—Charles A. Ruehl
Attorney, Agent, or Firm—D. Peter Hochberg; Mark M. Kusner; Louis J. Weisz

[57] ABSTRACT

Pressure sensor apparatus comprising fluid filled pads which are compressible in response to pressure for deflecting diaphragms to effect electrical signals reflective of the pressure.

25 Claims, 4 Drawing Sheets

SENSOR AND TRANSDUCER APPARATUS

BACKGROUND OF THE INVENTION

This invention relates to pressure and force sensing devices and to transducers for generating electrical signals corresponding to sensed pressure and force values.

A great many devices are known for sensing force and pressure values. (For the purpose of the present discussion, the terms force and pressure can be considered interchangeable, and to include other force related values such as torque). Many are mechanical in nature, and many are electrical devices. While many of these devices have proven very effective for their intended uses, there remains a need in many areas for compact, reliable, effective and inexpensive pressure sensor and transducer devices. For example, in U.S. patent application Ser. No. 834,609 (now abandoned) filed on even date herewith and entitled "Warning Systems for Excessive Orthopedic Pressures", a non-invasive system for monitoring the pressure beneath the cast on a part of the body is disclosed for warning when the measured pressure is approaching dangerous levels. That system should incorporate sensor and transducer devices which are compact enough to fit beneath the cast without requiring any modification to the cast's size or shape, reliable and effective to protect the patient, and inexpensive. Although means are known for measuring pressures beneath casts, among the reasons why such means are not widely used is their prohibitive cost, particularly in view of the present absence of such systems in present orthopedic procedures and the view that the addition of such systems would increase the cost of the cast.

Other applications for pressure monitoring systems which might well be fulfilled upon the availability of compact, reliable, effective and inexpensive pressure sensors and transducers are in the fields of athletics (measuring force applied to boxing gloves, boxing bags and running shoes; measuring total energy expended bicycling; monitoring pressure in ski bindings and ski boots; measuring muscular expansion in weight lifters), weight measurement, pneumatic tire pressure measurement, etc.

SUMMARY OF THE INVENTION

It is an object of the present invention to provide an inexpensive pressure sensor.

Another object is to provide a pressure sensor which is compact.

A further object is to provide a pressure sensor, which is reliable.

It is yet another object to provide a pressure sensor which is rugged.

The provision of pressure sensing systems for sensing the sum, the maximum, and the average of a number of sensed pressure values respectively, is another object of the invention.

Another object is the provision of an inexpensive transducer which is reliable.

Yet a further object is to provide a pressure transducer which is compact.

A further object is the provision of a pressure transducer which is rugged.

The provision of transducer systems for generating electrical signals reflective of the sum, maximum and the average of a number of sensed pressure values, respectively, is another object of the invention.

Other objects will be apparent from the description to follow and from the appended claims.

The foregoing objects are achieved according to preferred embodiments of the invention by the provision of one or more compressible fluid pads connected respectively to an expandable diaphragm. Compression of the pad causes expansion of the diaphragm. The pads in some instances are connected to one or more diaphrams, and the manner in which the fluid conduits are connected to the diaphragm is at least partially determinative of whether the sum of the sensed pressures, the maximum value of a number of sensed pressures or the average of a number of sensed pressures is determined. The fluid system is connected to a movable element in a variable reluctance circuit for changing the frequency in the circuit according to the movement of output diaphragm. Other aspects of preferred embodiments relate to the provision of a transducer circuit devices having members movable in response to the application of pressure to control the output of the circuit.

DETAILED DESCRIPTION OF THE PREFERRED EMBODIMENT

Figure 1:
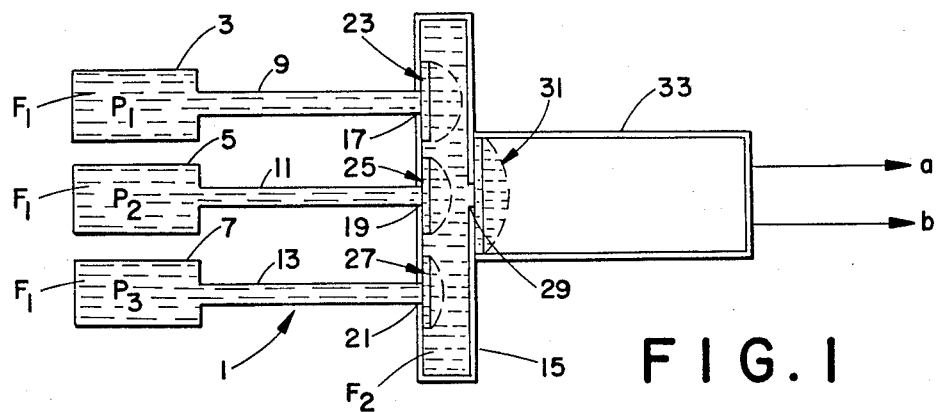
FIG. 1 is a schematic diagram of a sensor system according to a preferred embodiment of the invention for indicating the sum of a number of sensed pressures.

Referring first to FIG. 1, a sensor system 1 is shown composed of a number of compressible pads 3, 5 and 7 connected respectively by conduits 9, 11 and 13 to a fluid container 15. Although only three pads are shown, any number N of pads can be used where N is any number. The pads and their respective conduits are filled with a fluid F, which can be a gas such as air, but for most applications is preferably an incompressible liquid. The pads 3, 5 and 7 enter reservoir 15 through ports 17, 19 and 21 respectively. A diaphragm 23 extends over port 17 to isolate the volume of pad 3 and conduit 9 from container 15. Diaphragms 25 and 27 similarly seal off pad 5 and conduit 11, and pad 7 and conduit 13, respectively. Fluid F, thus fills each pad, its connecting conduit, and the region within the diaphragm associated with the respective conduits. A port 29 is provided in reservoir 15, and a transducer diaphragm 31 extends over port 29, the latter diaphragm being disposed in a casing 33. A displaceable deflection transfer means is in the form of a second fluid $F_2$, which fills the volume between diaphragms 23, 25, 27 and 31 (i.e. essentially filling reservoir 15), controls the flexing of diaphragm 31. Fluid $F_2$ can be the same as, or different from, fluid $F_1$. The output of sensor system 1 is reflected in the change of position of transducer diaphragm 31, providing an electrical parameter change which is shown by the arrows a, b. Outputs a and b are connected to a circuit for changing the frequency an oscillator circuit as described below.

When pressure is exerted on any or all of pads 3, 5 and 7, as indicated by the pressure values P1, P2 and P3, fluid $F_1$ moves through the respective conduits 9, 11 and 13 and effects an expansion of the respective diaphragms 23, 25 and 27. When not deflected, the diaphragms are attached tightly over the respective ports 17, 19 and 21 (as shown by the solid lines) to assure an accurate and detectable response to pressures P1, P2 and/or P3. FIG. 1 shows a situation where P1 is greater than P2, and P2 is greater then P3, wherefore the deflection of diaphragm 23 exceeds that of diaphragm 25, which exceeds that of diaphragm 27. The diaphragms in their deflected states are shown in dashed lines. The effective flow areas of conduits 9, 11 and 13 should be very narrow, to get a relatively large fluid movement and diaphragm deflection for even minute pressure changes.

The expansion of diaphragms 23, 25 and 27, exerts pressure on fluid $F_2$, and this in turn effects an expansion of transducer diaphragm 31 (from its solid position to its dashed line position) according to the sum of the deflection of diaphragms 23, 25 and 27, to yield a corresponding electrical parameter change a, b. Diaphragm 31 should be attached loosely over port 29 to assure an easy deflection of diaphragm 31 in response to deflections of diaphragms 23, 25 and 27 and to minimize the back pressure or resistance to such deflection in diaphragm 31. Also, each of diaphragms 23, 25, 27 and 31 should be secured as closely as possible to the ports over which they extend to prevent reverse deflection if the pressure in any of the pads is zero while that of a neighboring pad is greater than zero. Any pad(s) can be disconnected from container 15, as where it is located in an unrestricted region, to avoid undesired influence on other pads. The average of pressures P1, P2 and P3 is obtained by simply dividing the total pressure detected by the number of pads and associated diaphragms—in this case 3. This can be done electronically as noted below.

Figure 2:
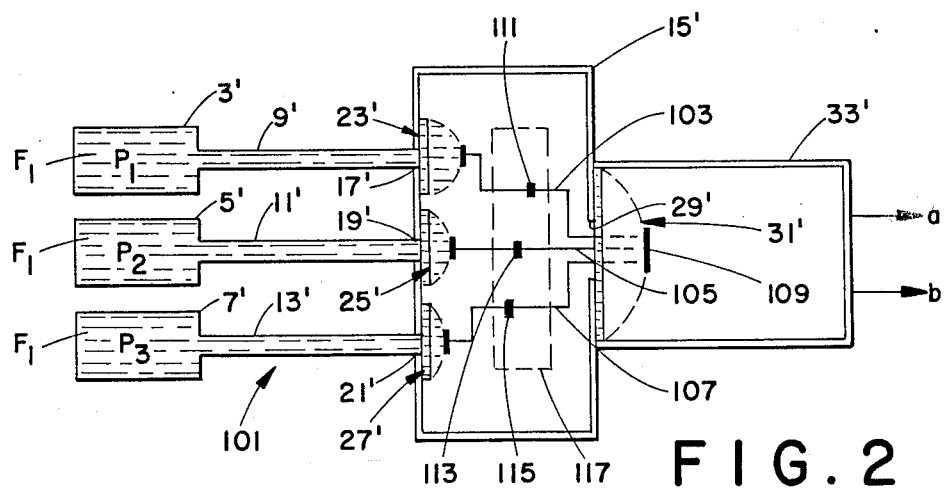
FIG. 2 is a schematic diagram of a sensor system according to a preferred embodiment of the invention for indicating the maximum value of a number of sensed pressures.

Turning next to FIG. 2, a sensor system 101 for measuring the maximum of a number of sensed pressures is shown. Ports corresponding to ports in system 1 of FIG. 1 have been ascribed corresponding reference numbers, but with a prime (') suffix. Thus, system 101 includes pads 3', 5+ and 7' connected respectively by conduits 9', 11' and 13' to a container 15' through ports 17', 19' and 21'. Diaphragms 23', 25' and 27' extend over the foregoing ports. Fluid fills the respective pad-conduit-diaphragm arrangements to form three independent, closed fluid subsystems.

Unlike reservoir 15, container 15' is not filled with fluid. The displaceable deflection transfer means are in the form of pushrods 103, 105 and 107, which are connected respectively at one end to diaphragms 23', 25' and 27' and to their opposite end to diaphragm 31'. A contact region 109 is the place where the pushrods contact diaphragm 31'. When pressures P1, P2 and P3 are applied to pads 3', 5' and 7', only the pushrod attached to the diaphragm having the greatest deflection contacts and moves diaphragm 31'. The amount of movement of diaphragm 31' is a measure of the maximum value of the pressures P1, P2 and P3, and determines the electrical paramter change a, b.

Pushrods 103, 105 and 107 have pressure markers 111, 113 and 115, and container 15' has a window 117 through which the pressure markers are visible so that one can observe the respective pad pressures. FIG. 2 shows a situation where P1 > P2 > P3, so that only pushrod 103 deflects transducer diaphragm 31'. It would be advantageous for diaphragms 23', 25' and 27' to be arranged in a triangular cluster so that each of pushrods 103, 105 and 107 can have the same length and shape.

The pushrods can be replaced with individual transducers at each of diaphragms 23', 25 and 27' (as indicated hereinafter), and this arrangement can be used to find the sum, average or maximum pressure by processing the signals electronically. However, the use of so many transducers could be undesirable.

Figure 3:
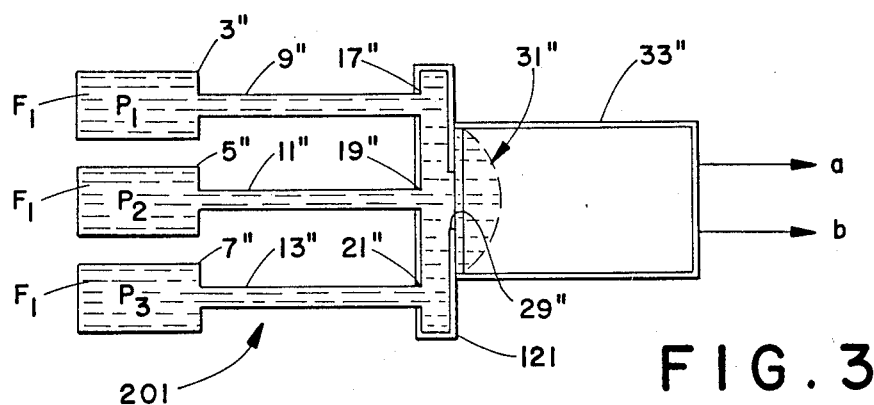
FIG. 3 is a schematic diagram of a sensor system according to a preferred embodiment of the invention for indicating the cumulative or average value of a number of sensed pressures.

Referring next to FIG. 3, a sensor system 201 is shown for measuring the sum of a number of sensed pressures. As with regard to FIG. 2, parts of system 201 corresponding to parts of system 1 in FIG. 1 have been ascribed corresponding reference numbers with double prime (") suffices. Thus, system 201 includes pads 3", 5" and 7" from which extend conduits 9", 11" and 13" respectively. The conduits are connected to a common fluid chamber 121 through ports 17", 19" and 21". A port 29" is also provided in chamber 121, and transducer diaphragm 31" extends over ports 29". Fluid $F_1$ is thus confined in the volume defined by pads 3", 5" and 7", conduits 9", 11" and 13", chamber 121 and the space under diaphragm 31" in housing 33". The pressures P1, P2 and P3 applied to pads 3", 5" and 7" are reflected as a common, cumulative pressure $P_{sum}$ in chamber 121 and throughout the fluid system, and $P_{sum}$ is reflected in the deflection of diaphragm 31" and in the value of electrical parameter change a, b. This is a particularly accurate arrangement since the pads are situated in a thoroughly restricted environment where they cannot expand if another pad is compressed. The improved accuracy occurs because reverse pressure from diaphragm 31" cannot influence the deflection characteristics of the other diaphragms. The average can be obtained as described with respect to the structure of FIG. 1.

The construction of the fluid pads can be very important, particularly when small pressures are to be detected, such as on the order of 30 mm Hg or 0.58 psi. As noted earlier, the fluid for most applications should be a liquid. However, if the sensor arrangement according to the invention is to be used for detecting temperature as for example for temperature compensation applications, the fluid $F_1$ should be air or other gas.

When the fluid is liquid, it is preferable to use an anti-freeze liquid to avoid the damage which could result if freezing temperatures are encountered. It has been found that diaphragms associated with the respective pads deflects with elevation, in that the deflection increases as the pad is elevated. It has been found that by initially filling the pads with a fluid-saturated absorbent such as sponge from which excess fluid has been allowed to discharge, the diaphragm does not react to pad position or temperature, although the diaphragm does maintain a fine sensitivity to changes in pressure applied to the pad. That is, the fluid in the sponge or other absorbent is not affected by changes in position, expansion or contraction, but it reacts immediately by discharging fluid to the diaphragm compartment of the slightest change in pressure.

Figure 4:
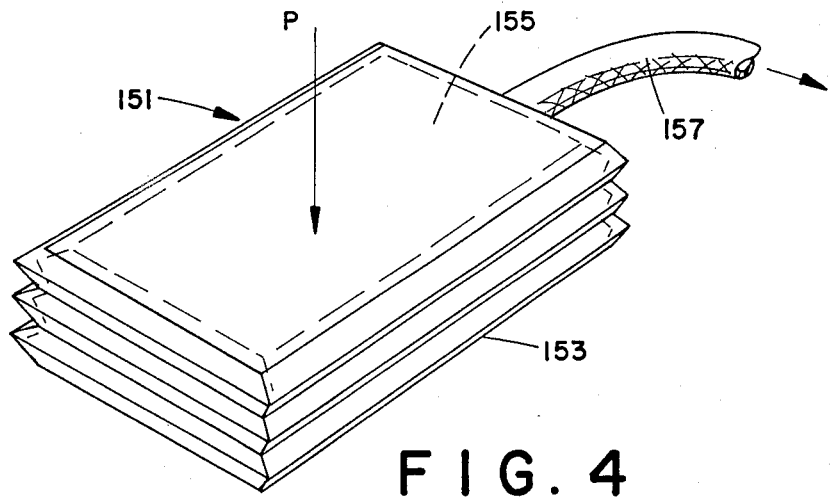
FIG. 4 is a perspective view of a sensor pad according to an aspect of the invention.

Finally, from many applications, the pad should be soft and pliable, but it should resist stretching since fluid displacement must move into the conduit and against the diaphragm and not into an increased volume created by a stretched pad. Particularly satisfactory materials for the pads have been found to be polypropylene and thick walled latex tubing. Furthermore, a bellows type pad construction offers the desired resistance to stretch, while providing a thin profile, and a high response sensitivity. Such a construction is shown in FIG. 4, where a pad 151 has pleated side walls 153, a fluid saturated sponge 155 and a fluid conduit 157. The applied pressure is shown by arrow P.

Figure 6:
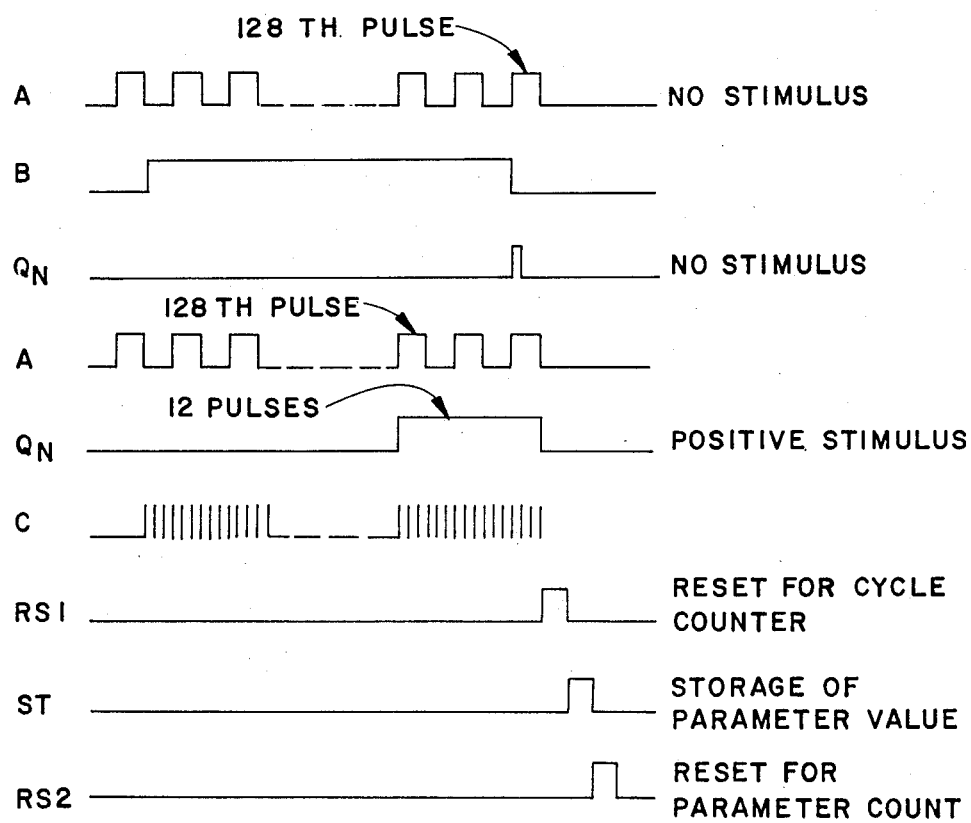
FIG. 6 is a timing diagram for the circuitry of FIG. 5.
Figure 5:
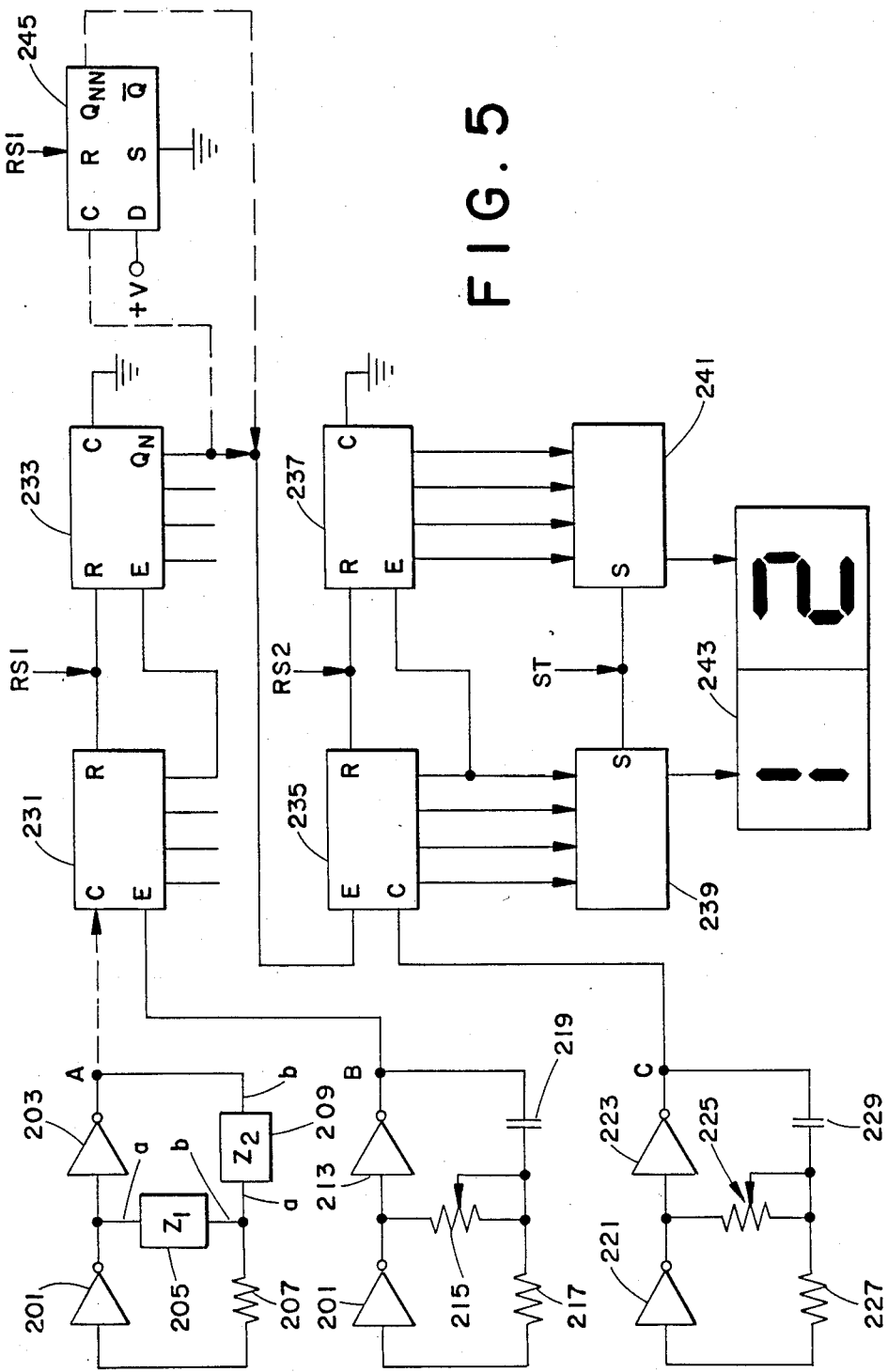
FIG. 5 is a circuit diagram of signal processing circuitry pursuant to an embodiment of the invention which incorporates a transducing oscillator for an inductive, resistive or capacitive sensing signal from a transducing diaphragm.

Turning next to FIG. 5, processor circuitry is shown for detecting variations in frequency, i.e. the repetition rate of a pulse train. FIG. 6 is a timing diagram for explaining the operation of the foregoing circuitry. The circuitry of FIG. 5 includes an oscillator network whose base frequency is modifiable according to the impedance values of $Z_1$ or $Z_2$, which in turn depend upon the physical displacement of an electrical component thereof to yield an electrical output reflective of such displacement. Such physical displacement is effected through the deflection of the transducer diaphragm 31, 31' or 31" of FIGS. 1-3. It will be recalled that the outputs of the sensor systems of FIGS. 1-3 was the output a, b, which is the input a, b of the oscillator networks in FIG. 5. The processor responds to changes in frequency and yields a numerical display whose magnitude is calibrated to the units of pressure being measured. If the active parameter is resistance or inductance, $Z_1$ is activated and $Z_2$ is fixed: if the active parameter is capacitance, $Z_2$ is activated and $Z_1$ is fixed. The following description for the processor discusses this arrangement.

A frequency generator to which the a, b outputs are connected supplies the signal in which frequency variation is to be detected. For simplicity and not as a limitation, the circuitry of FIG. 5 is used to describe its operation. For $Z_1$ active, a pair of inverters 201 and 203 are connected in series, and $Z_1$, a pressure sensitive variable resistance or inductance 205 is connected between the common connection of the inverters and through a resistor 207 to the input terminal of inverter 201. A fixed $Z_2$ capacitance impedance 209 is connected between the output terminal of inverter 203 and through the pressure sensitive $Z_1$ impedance 205 to the input terminal of inverter 203. If $Z_2$ is a pressure sensitive capacitance, $Z_1$ will then be a fixed value of resistance. The output terminal of inverter 203 is designated as point A and the signal present at that point is designated as signal A for convenience of reference. It is to be understood that the variable frequency oscillator shown in FIG. 5 as generating signal A can be replaced by any number of other variable frequency oscillators.

A timing oscillator is constructed similarly, including a pair of inverters 211 and 213 connected in series. The fixed terminals of a potentiometer 215 are respectively connected between the common connection of inverters 211 and 213 and (a) in series through a resistor 217 to the input of inverter 211 and (b) through a capacitor 219 to the output terminal of inverter 213. The wiping contact of potentiometer 215 is connected to one of the fixed terminals of the potentiometer. For purposes of explaining the operation of the embodiment, the signal observed at the output terminal of inverter 213 is designated as signal B.

A pulse train generator identical to the timing oscillator just described is provided, but its components can be of different values to produce different pulse widths and repetition rates. That generator includes a pair of inverters 221 and 223, a potentiometer 225, a feedback resistor 227 and a capacitor 229. The output signal at the output of inverter 223 is designated as signal C to aid description of the operation of the circuit.

The output of the frequency generator, signal A, is transmitted through a line connected to a counting means. In the embodiment shown, the counting means comprises two four bit counters, 231 and 233, connected in series to form an eight bit counter. The counters could each be one half of a CD4520 binary type circuit. Each four bit counter has a count input terminal C, an enable input terminal E, a reset terminal R and four output bit lines. Signal A is transmitted to terminals C of counter 231. The highest count bit line of counter 231 is connected to the E terminal of counter 233. The R terminals of each counter go to a reset line, RS1. The C terminal of counter 233 is grounded and its highest count bit line serves as an output terminal $Q_N$. The output signal B of the timing oscillator including inverters 211 and 213 is connected to enable terminal E of counter 231. When that enable terminal receives a high signal, counter 231 begins counting the pulses in signal A. When that count reaches the sixteenth pulse, meaning 16 pulses have been received, a high to low transition occurs at the highest bit line and so is transmitted to the enable terminal of counter 233 which, serving as a negative edge trigger, counts one unit. The process is repeated until a count of 128 pulses is reached whereupon the signal at terminal $Q_N$ goes high.

The $Q_N$ terminal of counter 233 is connected to an 8 bit counter driver, including two 4 bit counters 235 and 237 connected to each other as are counters 231 and 233. The enable terminal of counter 235 is connected to the $Q_N$ terminal of counter 233 and the C terminal of counter 235 receives the signal designated as C and generated by the pulse train generator including inverters 221 and 223. Counters 235 and 237 could each be half of a CD4518 BCD (binary coded decimal) type circuit. A reset line RS2 is connected to the reset terminals of counters 235 and 237. The output bit lines of each of counters 235 and 237 are connected, respectively to display drivers 239 and 241 which convert the BCD information into the form necessary to drive a two digit visual display 243. Drivers 239 and 241 each have a store terminal S, both of which are connected to a store line ST, and seven output terminals connected to display 243. Drivers 239 and 241 may each be a CD4056 type circuit if the display 243 is of the LCD type, in which case a back plane frequency is also provided.

FIG. 5 also includes in phantom lines a D-flip flop 245 having its C terminal connected to terminal $Q_N$ of counter 233 (which in this option is not connected to counter 235). A type CD4013 flip flop is suitable for this application. The $Q_{NN}$ output terminal of flip flop 245 is connected to the enable terminal of counter 235. Reset terminal R of flip flop 245 is connected to reset line RS1. As more fully explained below, the purpose of flip flop 245 is to hold or freeze a high signal generated at the $Q_N$ terminal of counter 233, since that signal could assume its low state in the embodiment after 256 pulses of signal A; this would disable the 235, 237 counters causing an incorrect reading to occur.

The operation of the circuit of FIG. 5 is more clearly understood by reference to the timing diagram of FIG. 6 where the top three time scales show the A and B signals and that at terminal $Q_N$ when no stimulus is applied, i.e., when the frequency of the frequency generator is in its initial condition state. If a transducer element is present at $Z_1$ or $Z_2$ in the frequency generator A, that state would be a quiescent one when no force or pressure is being applied to the transducer elements. The middle three time scales show the A and C signals and signal at terminal $Q_N$ when a positive sense stimulus is applied. The lower three time scales show the timing of the reset and store signals, RS1, RS2 and ST, respectively.

At the start of an interval, the timing means switches signal B to its high condition activating the cycle counter 231, 233 to count the transitions in the pulses generated by the frequency generating means 201, 203. The timing means is designed to switch signal B to its low state, ending the interval, on the positive transition of the 128th pulse, i.e., precisely when the $Q_N$ signal goes high, if the frequency generating signal, signal A, is of the constant, quiescent frequency. These conditions are shown in the top three time scales of FIG. 6. The end of timing cycle B generates reset pulse RS1 to clear the counters the zero in preparation of the next measurement interval. Pulses ST and RS2 follow. If a positive sense stimulus is applied causing the frequency of the signal A to increase, the $Q_N$ output goes high before the B signal goes low to disable the cycle counter and end the interval. This condition is illustrated in the middle three time scales of FIG. 6. In this situation, when the 128th pulse is reached and $Q_N$ goes high, the display driver counter 235, 237 is activated and begins counting the pulses in signal C. This counting continues until the end of the interval when the B signal goes low. The number of pulses of signal C counted is proportional to the increase in the frequency of signal A and, therefore, in the case of a linearly operating transducer element, proportional to the force or pressure applied. As before, the end of timing signal B generates reset pulse RS1 which clears the transducer counters 231, 233 and with $Q_N$ low disables the display counters 235 and 237. The store pulse ST then latches the pulse count of signal C into the display drivers 239, 241 and the information is displayed on digital display 243 as a measure of the magnitude of the stimulus, e.g. the force or pressure applied. Following the ST pulse and the reset signal RS2 the next interval of measurement can begin immediately if desired.

The circuitry of FIG. 5 visually displays the change in frequency above the base frequency. Each successive display interval shows a value proportional to the difference in frequency above the base value. Circuitry can also be provided to detect changes in frequency having a negative sense, i.e., changes reducing the frequency below the base or quiescent value.

FIGS. 1–3 disclosed various sensor pad techniques. Regardless of which of the pad techniques is used, the processor responds in the same way when pressure is applied.

Figure 7:
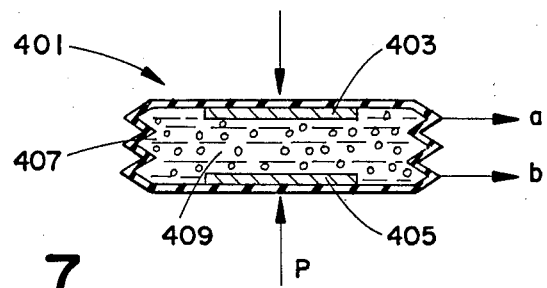
FIG. 7 shows in cross section a sensor according to another aspect of the invention wherein electrical characteristics are varied in accordance with sensed pressure.

The sensor systems of FIGS. 1–3 were mechanical (hydraulic) systems for controlling the electrical response of an electronic circuit through the displacement of a part of a component in that circuit. The invention also includes the direct physical displacement of parts of electrical components to achieve the desired electrical response, by the movement of fluid from a fluid-filled pad. Referring to FIG. 7, a pad 401 is shown having a flexible wall structure and a pair of conducting plates 403 and 405 on opposite sides of the pad. (Pad 401 can define a closed chamber which is stretchable or otherwise have means for enabling for the displacement of fluid in the chamber.) The output of pad 401 is shown by arrows a, b. Pad 401 is filled with a fluid 407 whose nature depends on the type of component pad 401 is. Fluid 407 preferably saturates a sponge 409 as discussed earlier. When there is no external pressure applied to pad 401, it assumes a relaxed state with plates 403, 405 relatively far apart. When external pressure P is applied, pad 401 is compressed to decrease the separation of plates 403 and 405. When such compression occurs, a change in the internal resistance, capacitance or inductance occurs, which is measured in terms of frequency in the transducer oscillator of FIG. 5. In this case, the pads are totally closed and pad "thickness" is the actual measuring media; i.e. no escape reservoir for fluid is required and there is no transducer diaphragm.

Fluid 407 can be an electrically resistive fluid, the resistance decreases as the separation of plate 403 and 405 decreases. Fluid 407 can alternatively be a dielectric (such as a dry sponge), the capacitance of the pad increases as the separation of plates 403 and 405 decreases (since $C = \epsilon A/d$, where $\epsilon =$ dielectric constant, $A =$ plate area, and $d =$ separation of the plates). If a sponge is used, it can be dampened with an anti-freeze liquid or gel to prevent freezing.

Inductive variation is also possible. In this case, a large diameter coil is used so that sufficient inductance is realized in the limited space available. In one approach, a thin, but large diameter ferrite slug reacts to increasing pressure by moving into the center of the coil—and vice versa for decreasing pressure. In a second approach, the large diameter coil is actually wrapped on a flat ferrite core and an equally flat "reluctance" shield is moved over or away from the coil. In both cases, the fluid filled pad provides the return force as the pressure goes down.

It is significant that charged carriers in fluids under the influence of a DC field normally migrate to one or the other of the electrodes depending on the polarity used. It should be noted that this will not occur with the approach discussed herein so long as the frequency signals possess both positive and negative polarities. That is, DC migration is avoided over extended periods of operation because the molecules remain in suspension as they rapidly change direction with the positive and then negative going field produced by the oscillator. However, both voltages are needed whereas a single polarity is sufficient with the hydraulic approach discussed above.

The sum, average or maximum pressure values as discussed above can also be taken with the type of system shown in FIG. 5. Since each pad has its own oscillator, the sum is taken by counting the frequency variation of each in an identical time related succession; the average is found by dividing the sum signal by three, and the maximum by simply letting the pad with the highest frequency enter the processor network; this, of course, assuming that frequency increases with increasing pressure. If not, then the lowest frequency enters the processor.

Figure 8:
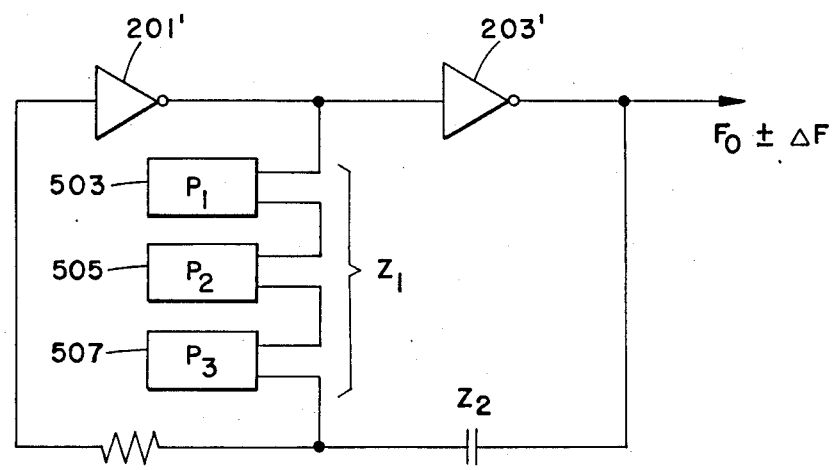
FIG. 8 is a circuit diagram of a transducing oscillator according to the invention, for generating signals corresponding to the sum or to the average value of pressure applied to sensor pads of the invention, where the resistance or the inductance is variable.

Turning next to FIG. 8, an oscillator is shown having inverters 201' and 203' corresponding to inverters 201, 203 of FIG. 5. The $Z_1$, impedance of FIG. 5 is used to detect variations in pads with resistive or inductive interiors, as discussed above with regard to FIG. 7. $Z_1$ of FIG. 7 can be composed of but one component, or a series of components, which is the arrangement shown in FIG. 8. The series-connected pads of FIG. 8 are identified by the numerals 503, 505 and 507, and the pressure applied to them is shown as P1, P2 and P3. The effect on the oscillator frequency $F_o \pm \Delta F$ corresponds to the sum of the pressures on N series-connected pads, wherein the FIG. 8, N=3.

Figure 9:
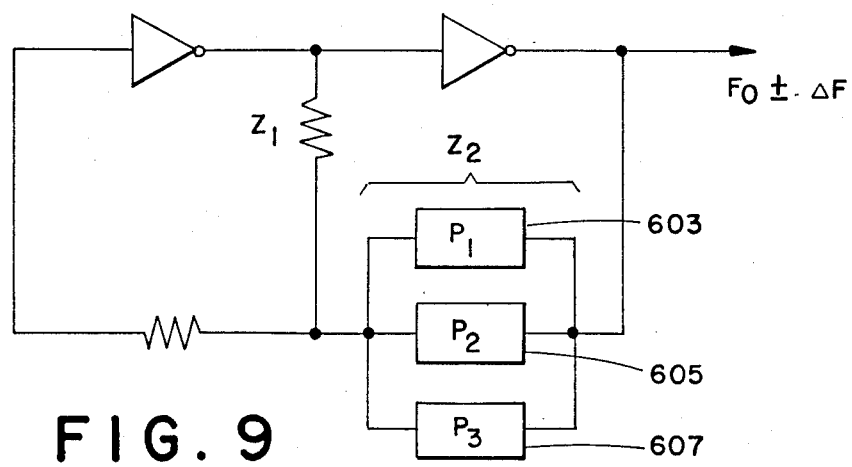
FIG. 9 is a circuit diagram for an oscillator of the type shown in FIG. 8, but where the capacitance is variable.

FIG. 9 shows another oscillator having inverters 201" and 203" corresponding to components 201 and 203 of FIG. 5. In the circuit of FIG. 9, like that in FIG. 5, the $Z_2$ impedance is used for variable impedance values. In FIG. 9, a set of parallel-connected pads 603, 605 and 607 have capacitative interiors. Pressures P1, P2 and P3 are applied to the respective pads. Since the capacitance of capacitances connected in parallel are additive, the influence of N pads with capacitative interiors on frequency is also cumulative. Hence, the effect of N capacitative pads is the sum of their capacitances; in FIG. 9, N=3.

In the arrangements of FIGS. 8 and 9, it is a straight forward matter of obtaining the maximum pressure value. Accordingly, each pad is connected to its own oscillator, and only the pad effecting the greatest change in oscillator frequency is detected, processed and displayed.

Finally, it will be recalled that the systems described above find applicability in pressure measuring networks for use with casts applied to the body. In order to establish a temperature-stable network, a companion system of pads that are exposed to body temperature only, i.e. without the application of pressure, will yield the means for comparison signals in order to compensate for temperature variations of the environment.

The invention has been described with particular emphasis on the preferred embodiments, but it should be understood that variations and modifications within the spirit and scope of the invention may occur to those skilled in the art to which the invention pertains.

We claim:

1. A pressure sensor apparatus comprising:
    at least one pad means for holding a quantity of fluid, said pad means being compressible in response to the application of pressure to said pad means for displacing said fluid;
    at least one first diaphragm means operatively connected to said pad means for deflection in response to displacement of fluid in response to compression of said pad means by an amount reflective of the pressure applied to said pad means;
    fluid contained in said pad means;
    transducer diaphragm means operatively associated with said first diaphragm means;
    at least one displaceable deflection transfer means interconnecting said first diaphragm means and said transducer diaphragm means; and
    fluid container means operatively associated with said first diaphragm means and with said transducer diaphragm means;
    wherein said displaceable deflection transfer means comprises fluid in said container, said fluid being displaceable in response to the deflection of said first diaphragm means for deflecting said transducer diaphragm means.

2. The apparatus according to claim 1 further comprising:
    conduit means extending from said pad means and having a fluid discharge port;
    said first diaphragm means closing said discharge port, and said fluid being displaced through said conduit upon the compression of said pad means to effect said deflection of said first diaphragm means.

3. The apparatus according to claim 1 wherein said pad means comprises a plurality of pads and said first diaphragm means comprises a plurality of first diaphragms operatively connected to each of the respective pads for deflection in response to the displacement of fluid in each of the respective pads.

4. The apparatus according to claim 3 wherein said displaceable deflectioon transfer fluid deflects said transducer diaphragm means by an amount reflective of the sum of the deflection of said first diaphragms.

5. The apparatus according to claim 3 wherein said displaceable deflection transfer means deflects said transducer diaphragm means according to the maximum deflection of the respective first diaphragms.

6. The invention according to claim 1 wherein said pad means comprising a plurality of pads, and said apparatus further comprises
    conduit means extending from the respective pad means and each conduit having a discharge port;
    and wherein said first diaphragm means closes said ports and said first diaphragm means being deflectable in response to the displacement of fluid from said pads by an amount reflective of the sum of the pressures applied to the respective pads.

7. The invention according to claim 1 wherein said electrical signal generating means is a capacitive device having relatively movable plates, and said movable control means is one of said plates.

8. Apparatus according to claim 1 and further including electrical signal generating means having movable control means for varying said output signal according to the position of said control means, said transducer diaphragm means moving said control means in response to the deflection of said transducer diaphragm means.

9. The apparatus according to claim 8 wherein said electrical signal generating means comprises an oscillator having a reluctance device, said output signal is a signal having a predetermined base frequency, and said control means comprises a movable member in said reluctance device for varying said predetermined base frequency according to the position of said movable member.

10. Apparatus according to claim 9 wherein said reluctance device is an inductance device, and said movable member is one of an inductance coil and a core member movable relative to said coil.

11. The invention according to claim 8 wherein said electrical signal generating means is a resistive device, and said movable control means is a resistive member for determining the resistance of said resistive device according to the position of said member.

12. Apparatus according to claim 1 and further including fluid absorbing means disposed in said pad means, said fluid absorbing means being saturated with said fluid contained in said pad means.

13. Apparatus according to claim 1 wherein said fluid is liquid anti-freeze.

14. Apparatus according to claim 1 and further including temperature sensitive pad means not responsive to pressure for compensating said apparatus for changes in temperature.

15. A pressure sensor apparatus comprising:
at least one pad means for holding a quantity of fluid, said pad means being of a unitary construction having a flexible wall structure and compressible in response to the application of pressure to said pad means for displacing said fluid;
at least one first diaphragm means operatively connected to said pad means;
fluid contained in said pad means;
said fluid being displaced in response to the compression of said pad means to deflect said diaphragm means by an amount reflective of the pressure applied to said pad means;
transducer diaphragm means operatively associated with said first diaphragm means; and,
at least one displaceable deflection transfer means interconnecting said at least one first diaphragm means and said transducer diaphragm means;
said transducer diaphragm means deflecting in response to the displacement of said deflection transfer means for deflecting said transducer diaphragm means according to the deflections of said first diaphragm means.

16. The apparatus according to claim 15 further comprising:
conduit means extending from said pad means and having a fluid discharge port;
said first diaphragm means closing said discharge port, and said fluid being displaced through said conduit upon the compression of said pad means to effect said deflection of said first diaphragm means.

17. The apparatus according to claim 15, further including fluid container means operatively associated with a plurality of the diaphragm means and with said transducer diaphragm means; wherein said displaceable deflection transfer means comprises fluid in said container, said fluid being displaceable in response to the deflection of a plurality of the diaphragm means for deflecting said transducer diaphragm means, and said pad means is constructed from polypropylene or thick walled latex tubing.

18. The apparatus according to claim 17 wherein said displaceable deflection transfer fluid deflects said transducer diaphragm means by an amount reflective of the sum of the deflection of said first diaphragms.

19. The apparatus according to claim 17 wherein said displaceable deflection transfer means deflects said transducer diaphragm means according to the maximum deflection of the respective first diaphragms.

20. The apparatus according to claim 15 wherein said displaceable deflection transfer means comprises push rod means interconnecting the respective plurality of first diaphragm means and said transducer diaphragm means for deflecting said transducer diaphragm means according to the deflections of a plurality of said first diaphragm means.

21. The apparatus according to claim 15 and further including electrical signal generating means for generating an output signal, said signal generating means having movable control means for varying said output signal according to the position of said control means, said transducer diaphragm means moving said control means.

22. The apparatus according to claim 21 wherein said electrical signal generating means comprises an oscillator having a frequency varying device, said output signal is a signal having a predetermined base frequency, and said control means comprising a moveable member in said frequency varying device for varying said predetermined base frequency according to the position of said moveable member.

23. The apparatus according to claim 22 wherein said frequency varying device is an inductance device, and said movable member is one of an inductance coil and a core member movable relative to each other.

24. The apparatus according to claim 21 wherein said electrical signal generating means is a resistive device, and said movable means is a resistive member for determining the resistance of said resistive device according to the position of said means.

25. The apparatus according to claim 31 wherein said electrical signal generating means is a capacitive device having relatively movable plates, said movable means being one of said plates.

* * * * *